United States Patent [19]
Murata

[11] Patent Number: 5,587,977
[45] Date of Patent: Dec. 24, 1996

[54] RECORDING/REPRODUCING APPARATUS HAVING MEANS TO DETECT THE EXCHANGE OF AN EXTERNAL MEMORY

[75] Inventor: Yasumoto Murata, Nara-ken, Japan

[73] Assignee: Sharp Kabushiki Kaisha, Osaka, Japan

[21] Appl. No.: 517,270

[22] Filed: Aug. 21, 1995

Related U.S. Application Data

[63] Continuation of Ser. No. 207,597, Mar. 9, 1994, abandoned.

[30] Foreign Application Priority Data

Mar. 17, 1993 [JP] Japan ..................... 5-057543

[51] Int. Cl.$^6$ ................................. G11B 19/00
[52] U.S. Cl. ................................. 369/25; 369/29
[58] Field of Search ................... 369/25, 26, 27, 369/28, 29, 30, 24, 2; 360/60–63, 69, 71, 72.3

[56] References Cited

U.S. PATENT DOCUMENTS 4,113,994   9/1978   Bolick, Jr. et al. ............. 369/27

FOREIGN PATENT DOCUMENTS 60-12591   7/1983   Japan .

Primary Examiner—Ali Neyzari

[57] ABSTRACT

A recording/reproducing apparatus for recording and reproducing an audio signal. The apparatus includes an external memory which can be mounted in and dismounted from the apparatus at will, and an internal buffer memory for temporarily storing the audio data. In the apparatus, a detection circuit detects the exchange of the external memory, and produces an output signal when the external memory is exchanged into a new external memory. In response to the output signal, an audio data transfer circuit transfers the audio data stored in the internal memory into the newly mounted external memory, thereby avoiding interruption of the recording during the exchange of the external memory.

20 Claims, 3 Drawing Sheets

RECORDING/REPRODUCING APPARATUS HAVING MEANS TO DETECT THE EXCHANGE OF AN EXTERNAL MEMORY

This application is a continuation, of application Ser. No. 08/207,597 filed on Mar. 9, 1994, now abandoned.

BACKGROUND OF THE INVENTION

1. Field of the Invention

The present invention relates to a recording/reproducing apparatus in which an analog audio signal is encoded into a digital audio data and the digital audio data is stored in a semiconductor memory device.

2. Description of the Related Art

In recent years, a digital recording/reproducing apparatus has been put to practical use in various fields. Such a digital recording/reproducing apparatus converts an analog audio signal into digital data and stores the digital audio data in memory means. The use of a semiconductor memory as the memory means makes possible a random access to the digital audio data stored in the memory. A digital recording/reproducing apparatus including such a semiconductor memory is suitable particularly for a dictating machine, because it is required for a dictating machine to be able to reproduce an audio signal immediately after the signal was recorded, and to reproduce any arbitrary portion of the recorded signal.

FIG. 3 shows an example of a conventional digital recording/reproducing apparatus in which a semiconductor memory is used as memory means (Japanese Laid-Open Patent Publication No. 60-12591). The digital recording/reproducing apparatus utilizes an internal memory 21 and a memory pack 22. The memory pack 22 can be mounted in or dismounted from the apparatus at will. A digital audio data encoded in an encoding circuit 23 is first written into the internal memory 21 through an audio recording controller 24. When the internal memory 21 is filled with the audio data, the audio recording controller 24 changes the destination of the memory to which the audio data to be stored is transferred, whereby immediately subsequent audio data will next be stored in the memory pack 22. Accordingly, recording operations of the internal memory 21 and the memory pack 22 are carried out in series (cascade connection). The memory pack 22 has conventionally been used merely as a storage for compensating for the lack of capacity of the internal memory 21. The digital audio signal is read out from the internal memory 21 or the memory pack 22 and is converted into an analog audio signal by a decoding circuit 25.

In the above-mentioned conventional digital recording/reproducing apparatus, the memory pack 22 starts the recording operation after the internal memory becomes full. When the memory pack 22 becomes full, no audio data can be stored in the apparatus. However, if the storage capacity of the memory pack 22 is exhausted during the recording operation, the sound recording is interrupted while the memory pack 22 is exchanged, which has caused a problem.

If two memory packs 22 are mounted at the same time in the digital recording/reproducing apparatus, even though the first memory pack consumes its storage capacity, the audio data can immediately be transferred into the second memory pack so as to continue the recording. Moreover, the first memory pack can be exchanged by the time the second memory pack is filled with the audio data, so that a continuous recording can be realized for a long time period without any interruption. However, in this case, two pairs of a connector and an interface circuit are required for mounting two memory packs in the apparatus, which causes other problems of making a larger sized apparatus and of rising cost.

SUMMARY OF THE INVENTION

A recording/reproducing apparatus for recording and reproducing an audio signal, according to the present invention comprises: an audio encoding circuit for receiving an audio signal and converting the audio signal into audio data; an external memory for storing the audio data, the external memory being mounted in and dismounted from the apparatus at will; an internal memory for temporarily storing the audio data, the internal memory being built in the apparatus; a memory controller for controlling writing and reading operations of the audio data; a detection circuit for detecting the exchange of the external memory, the detection circuit producing an output signal when the external memory is exchanged into another external memory; and an audio data transfer circuit for, in response to the output signal from the detection circuit, transferring the audio data stored in the internal memory into the another external memory.

In one embodiment of the invention, the memory controller comprises: an internal memory controller for controlling writing and reading operations of the audio data into the internal memory; and an external memory controller for controlling writing and reading operations of the audio data into the external memory.

In another embodiment of the invention, the detection circuit further comprises: a storage capacity detection circuit for detecting that remaining storage capacity in the external memory becomes less than a prescribed level and then outputting a first detection signal indicating same; an exchange detection circuit for detecting that the eternal memory is exchanged into another external memory and then outputting a second detection signal indicating that the another external memory is mounted; and a transfer completion detection circuit for detecting, after the audio data transfer means has started transferring the audio data, that all of the audio data temporarily stored in the internal memory has been transferred into the other external memory, and for then outputting a third detection signal indicating that all of the audio data has been transferred into the other external memory.

In still another embodiment of the invention, the apparatus further comprises: a first request-signal production circuit for producing a first request-signal requesting the external memory control means to write the audio data into the external memory; a second request-signal production circuit for, in response to the first detection signal, producing a second request-signal requesting the internal memory write the audio data into the internal memory; a third request-signal production circuit for, in response to the second detection signal, producing a third request-signal requesting the internal memory controller to read out the audio data from the internal memory, and requesting the external memory controller to write the audio data read from the internal memory into the other external memory; and a fourth request-signal production circuit for, in response to the third detection signal, producing a fourth request-signal requesting the external memory control to write the audio data into the other external memory.

In still another embodiment of the invention, the apparatus further comprises an alarm device for, in response to the first detection signal, issuing an alarm for a memory exchange.

In still another embodiment of the invention, the external memory is an IC card.

In still another embodiment of the invention, the internal memory means has a smaller storage capacity than that of the external memory.

Thus, the invention described herein makes possible an advantage of providing of a recording/reproducing apparatus capable of continuously recording for a long time period without any interruption of a sound while successively exchanging external memories by temporarily using an internal buffer memory.

This and other advantages of the present invention will become apparent to those skilled in the art upon reading and understanding the following detailed description with reference to the accompanying figures.

According to the invention, an audio signal input into the recording/reproducing apparatus is successively encoded and converted into audio data. The audio data is stored in an external memory by an audio recording controller. Accordingly, in the recording/reproducing apparatus of the present invention, the audio data is originally to be recorded in the external memory which can be mounted in or dismounted from the apparatus at will. If the rest of the capacity in the external memory is exhausted or becomes less than the prescribed level during the recording, an external memory capacity detection circuit detects this and requests the audio recording controller to instruct the encoded audio data to be stored into a buffer memory built in the apparatus. Accordingly, the audio data can continuously be recorded in the buffer memory without any interruption, subsequent to the remaining storage capacity of the external memory being exhausted.

In this case, since an alarm device issues an alarm to exchange the external memory, the user can be informed that the external memory currently used should be exchanged into a new one. When an external memory exchange detecting portion detects that the external memory is exchanged, an audio data transfer circuit starts transferring the audio data stored in the buffer memory to the external memory. Transferring the audio data to the external memory can be conducted at a higher speed than that required for storing the audio data into the buffer memory by the audio recording controller. In the buffer memory, the read operation for transferring can be conducted faster than the write operation for storing, so that the read operation overtakes the write operation. Thus, by comparing an address for reading in the buffer memory with an address for writing a transfer completion detecting circuit can detect that all of the audio data in the buffer memory has been completely transferred into the external memory.

As is apparent from the above, when the transfer completion detection circuit detects the completion of the transfer, the audio recording controller is shifted so as to instruct the encoded audio data to be stored into the external memory again.

As a result, according to the recording/reproducing apparatus of the present invention, the buffer memory built in the apparatus can temporarily store audio data before the rest of the capacity in the external memory is exhausted during the recording. Thus, when the external memory is exchanged the buffer memory can temporarily be written with audio data, so that the recording can continuously be performed without any interruption of sound.

DESCRIPTION OF THE PREFERRED EMBODIMENTS

Hereinafter, the present invention will be described by way of examples, with reference to the accompanying drawings.

Figure 1:
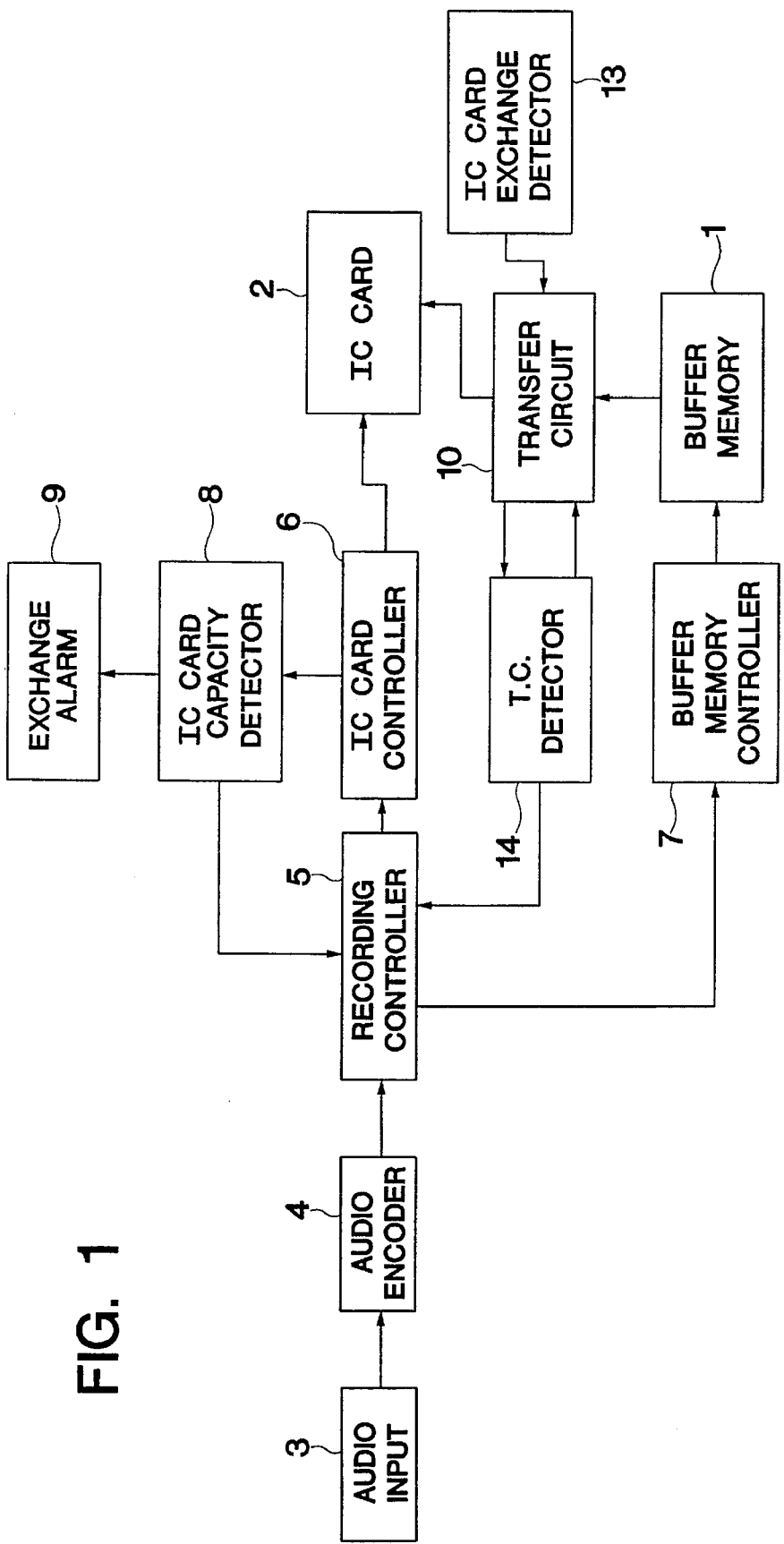
FIG. 1 is a block diagram showing an exemplary structure of a recording portion in a recording/reproducing apparatus of the present invention.

Referring to FIG. 1, a recording/reproducing apparatus of the present invention has a buffer memory (internal memory) 1 and an IC card (external memory) 2. The IC card 2 can be mounted in or dismounted from the apparatus at will. The buffer memory 1 serves as an auxiliary memory which stores audio data during the time required for exchanging the IC card 2 (as will be described below). Therefore, the buffer memory 1 does not have to have a large volume of storage capacity. For example, the buffer memory 1 has a storage capacity sufficient for storing the audio data for approximately 1 minute. In contrast, the IC card 2 has a storage capacity for a longer time of recording.

The buffer memory 1 and the IC card 2 may include an SRAM (Static Random Access Memory) which can be backed-up by a small battery. The buffer memory 1 is used merely for temporary storage of an audio data, so that the battery backup is not necessarily required for the buffer memory 1. However, it is preferable to use an SRAM for the buffer memory 2 since the data stored in an SRAM can be accessed with a relatively high speed. The buffer memory 1 and the IC card 2 may include another type of semiconductor memory, as well as the SRAM.

Figure 2:
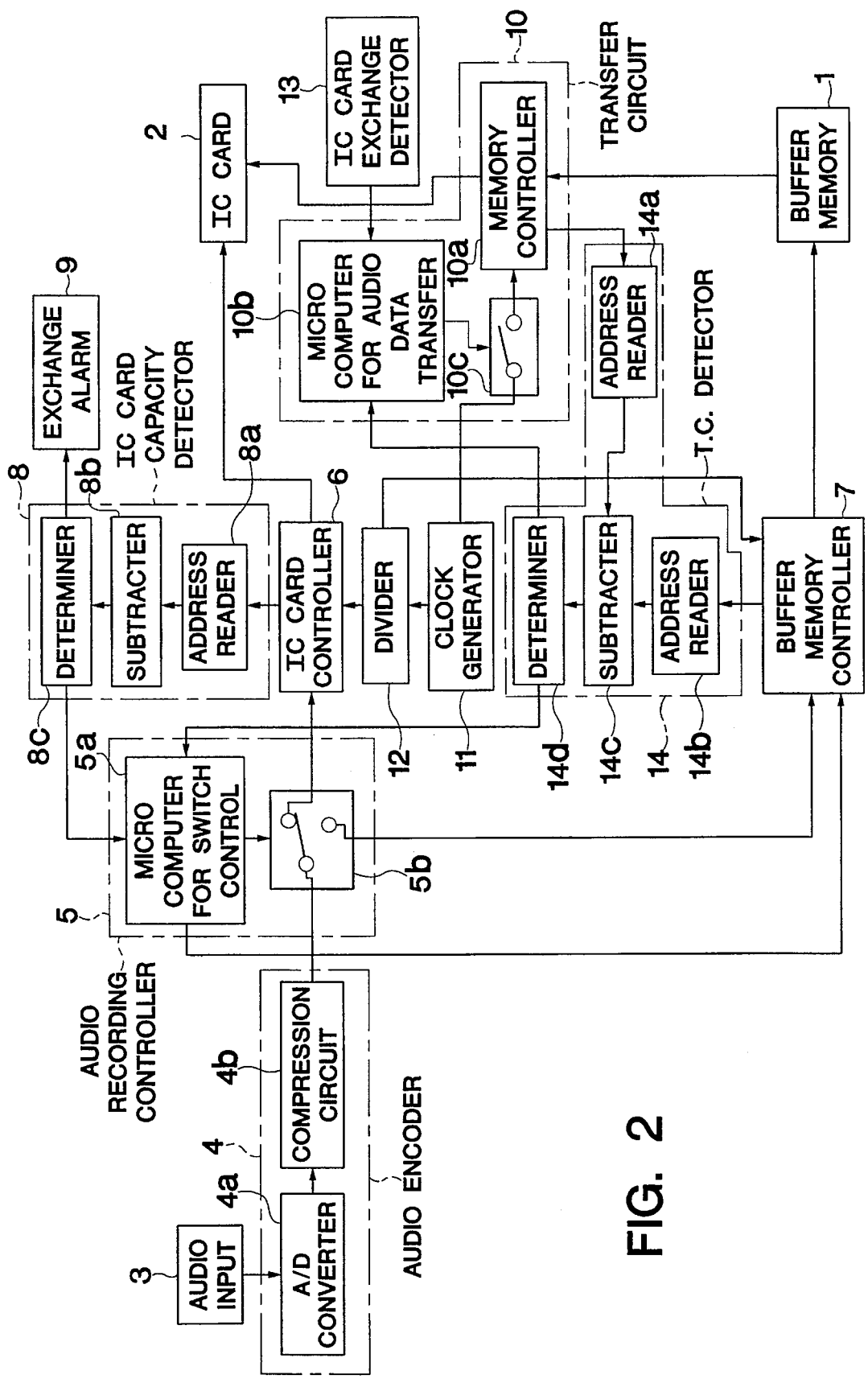
FIG. 2 is a block diagram showing more particularly and in more detail the exemplary structure of the recording portion in a recording/reproducing apparatus of the present invention.
Figure 3:
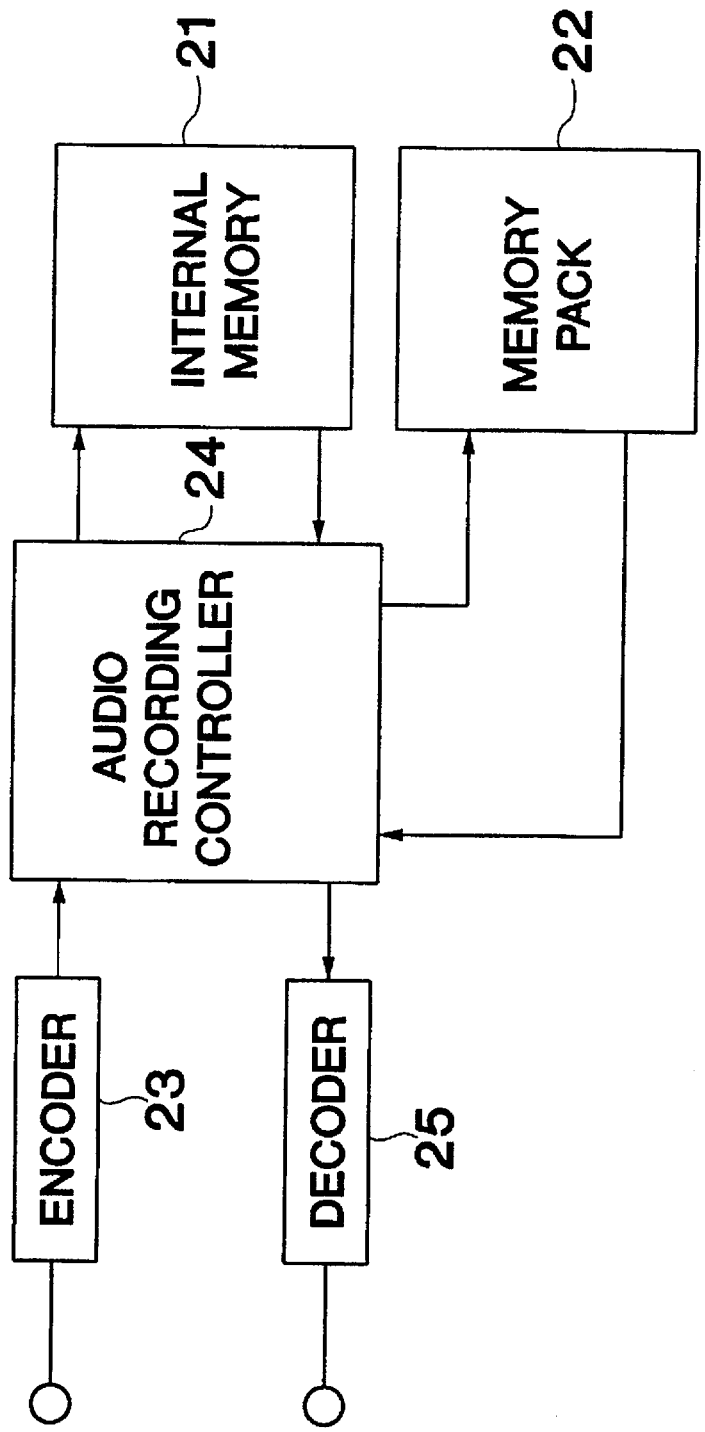
FIG. 3 is a block diagram showing a structure of a conventional digital recording/reproducing apparatus.

An audio input portion 3, for example, a microphone, produces an analog audio signal. The analog audio signal is amplified and sent to an audio encoding circuit (audio encoder) 4. The audio encoding circuit 4 includes an A/D converter 4a and a data compression circuit 4b, as is shown in FIG. 2. The A/D converter 4a converts the analog audio signal into the digital audio data, and the data compression circuit 4b compresses the digital audio data so as to ensure a longer recording time with the same storage capacity.

In this example, the conversion of the analog audio signal into the digital audio data and the compression of the data are conducted with an adaptive differential PCM (Pulse Code Modulation) system. In the adaptive differential PCM system, the deterioration of sound quality is by an adaptive quantization, while data is compressed by differentially encoding, thus taking advantage of the relationship between the audio signals, or the data may be further compressed.

The digital audio data encoded by the audio encoding circuit 4 is sent to an IC card controller 6 or a buffer memory controller 7 via an audio recording control circuit (recording controller) 5. As is shown in FIG. 2, the audio recording control circuit 5 includes a microcomputer 5a and a switch 5b. The microcomputer 5a controls the switch 5b so that the audio data from the audio encoding circuit 4 is sent to a selected one of the IC card controller 6 and the buffer memory controller 7.

The switch 5b may be a multiplexer for shifting a path for the audio data. In the case where the IC card controller 6 and the buffer memory controller 7 are connected to each other by the same bus line, the switch 5b may be a circuit for designating different addresses based on the difference between an address of the IC card controller 6 and an address of the buffer memory controller 7.

The IC card controller 6 includes a control circuit for writing audio data into the IC card 2. The IC card controller 6 is connected to an IC card storage capacity detection circuit 8 (hereinafter, referred to as a "capacity detector 8"). The capacity detector 8 calculates the remaining storage capacity of the IC card 2 based on information from the IC card controller 6, and produces an IC card storage capacity filling signal (hereinafter, referred to as a "CF signal") in the case where the remaining storage capacity is less than a prescribed value.

In the case where writing of data is conducted only in a sequential manner from a first initial address to a final address in the IC card 2, the remaining storage capacity in the IC card 2 can be detected by calculating the difference between the final address and current address at which a current data is written. By comparing the remaining storage capacity with the prescribed value, the remaining storage capacity in the IC card 2 can be determined. As shown in FIG. 2, the capacity detector 8 includes an address reading circuit 8a, a subtracter 8b and a determiner 8c. The address reading circuit 8a reads out an address of the memory location in the IC card 2 where the audio data is currently being written into by the IC card controller 6; the subtracter 8b calculates the difference between the read address and the final address of the IC card 2; and the determiner 8c determines if the difference is less than the prescribed value.

In the case where writing is performed in vacant regions in the IC card 2 in a random manner by the IC card controller 6, only the address can be detected and the remaining storage capacity cannot be detected. Thus, it is required to count the number of vacant memory locations in the IC card 2. In addition, in the case where the buffer memory 1 has sufficient storage capacity, the capacity detector 8 may produce the CF signal when the remaining storage capacity in the IC card 2 is completely exhausted.

When detecting that the remaining storage capacity of the IC card 2 is almost exhausted, the capacity detector 8 sends the CF signal to both of the audio recording control circuit 5 and an IC card exchange alarm device 9. In response to the CF signal, the IC card exchange alarm device 9 informs the user to exchange the IC card 2 by playing a melody. The IC card exchange alarm device 9 may issue the alarm by lighting an alarm lamp or the like, as well as playing the melody. When the microcomputer 5a in the audio recording control circuit 5 receives the CF signal, in response to the CF signal, the microcomputer 5a controls the switch 5b so that the audio data from the audio encoding circuit 4 will be sent to the buffer memory controller 7 through which the audio encoding circuit 4 writes audio data into the buffer memory 1.

An audio data transfer circuit 10 is connected between the buffer memory 1 and the IC card 2. The audio data transfer circuit 10 transfers the audio data stored in the buffer memory 1 into a newly mounted IC card 2. The audio data which is read out from the initial address to the final address in the buffer memory is transferred to the IC card 2, and then the audio data is written into the IC card 2 from the initial address to the final address. This data transfer operation is conducted at a significantly higher speed than that required for a writing operation of the audio data into the buffer memory 1.

If the newly mounted IC card 2 has regions where data have already been written and overwriting is not permitted in such regions, then the audio data is transferred into vacant regions of the IC card 2 so as to avoid overwriting.

As is shown in FIG. 2, the audio data transfer circuit 10 includes a memory controller 10a, a microcomputer 10b and a switch 10c. The memory controller 10a performs the transfer operation of the audio data in synchronization with a clock signal provided from a clock generator 11 through the switch 10c. The clock generator 11 provides the clock signal to the IC card controller 6 and the buffer memory controller 7 through a divider 12. The memory controller 10a can transfer the audio data at a higher speed by the dividing ratio of the divider 12, compared with the speed of writing the audio data into the buffer memory 1 through the buffer memory controller 7. The audio data transfer circuit 10 transfers the audio data by using a path separated from a bus line or the like used for writing the audio data into the buffer memory 1 and the IC card 2 by the audio recording controller 5. However, the transfer of the audio data can also be conducted by using the common bus line or the like. Alternatively, the data transfer may be carried out according to software, a DMA, or the like, by the audio recording control circuit 5.

When the microcomputer 10b receives an IC card exchange completion signal (EC signal) from an IC card exchange detecter 13, the microcomputer 10b controls the switch 10c so as to provide the clock signal to the memory controller 10a, thereby starting transfer of the audio data. Subsequently, when the microcomputer 10b receives a transfer completion signal (TC signal) from a transfer completion detection circuit (TC detector) 14, the microcomputer 10b controls the switch 10c so as to stop providing the clock signal, thereby terminating the transfer of the audio data.

For the IC card detection, for example, it is preferable to employ a switch which can output an "ON" signal or an "OFF" signal according to the connection state of the IC card. In more detail, such a switch is designed to be turned on when the IC card is mounted in the apparatus and to be turned off when the IC card is dismounted. When such a switch is used, the IC card exchange detector 13 can detect the IC card exchange based on the change in the output from the switch, thereby producing the EC signal.

The transfer completion detection circuit 14 detects the completion of the transfer of the audio data and then produces the transfer completion signal (TC signal). The detection is performed based on information from the audio data transfer circuit 10 and the buffer memory controller 7.

The completion of the transfer of the audio data can be detected by whether or not the address of the audio data read out, at a higher speed, from the buffer memory 1 by the audio data transfer circuit 10 overtakes the address of the audio data written, at a normal speed, in the buffer memory 1 by the buffer memory controller 7. As is shown in FIG. 2, the transfer completion detection circuit 14 may include a first address reading circuit 14a, a second address reading circuit 14b, a subtracter 14c and a determiner 14d. The first address reading circuit 14a reads out an address on which the memory controller 10a is currently reading from the buffer memory 1; the second address reading circuit 14b reads out an address on which the buffer memory controller 7 is currently writing into the buffer memory 1; the subtracter 14c calculates the difference between these addresses; and the determiner 14d detects if the difference is zero.

In addition, in the case where the write of the audio data by the buffer memory controller 7 reaches the final address of the buffer memory 1, the buffer memory 1 can be used as a ring buffer by the continuation of writing the audio data in regions from which the audio data has already been read by the audio data transfer circuit 10.

The transfer completion detection circuit 14 sends the TC signal also to the audio recording controller 5. When the microcomputer 5a in the audio recording controller 5 receives the TC signal, the audio data from the audio encoding circuit 4 is sent to the IC card controller 6 again by changing the state of the switch 5b and is then written into the IC card 2. In this case, the audio data is written into the IC card 2 following the audio data being transferred from the buffer memory 1.

In the recording/reproducing apparatus with the above-mentioned structure, when the power is applied to the apparatus, the microcomputer for controlling an overall apparatus confirms whether or not the IC card 2 is actually mounted in the apparatus by using the IC card exchange detector 13. In the case where the IC card 2 is not mounted in the apparatus, an error message is output by means of the IC card exchange alarm device 9 or the like, thereby informing the user to mount the IC card 2 in the apparatus. When the IC card 2 is mounted in the apparatus and a recording button is pressed, the microcomputer 5a shifts the switch 5b to the side of the IC card controller 6. Then, the audio signal input from a microphone or the like in the audio input portion 3 is converted into the audio data by the audio encoding circuit 4 and written into the IC card 2 through the IC card controller 6, thereby starting the recording operation.

When the remaining storage capacity in the IC card 2 is almost exhausted during the recording operation, the IC card exchange alarm device 9 issues the alarm with a melody or the like, which informs the user to exchange the IC card 2. The audio recording control circuit 5 continues writing the audio data into the buffer memory 1 until the IC card 2 is exchanged. Accordingly, in the recording/reproducing apparatus, the recording can continuously be conducted without any interruption of sound even during the time for exchanging the IC card 2.

When the exchange of the IC card 2 is completed, the audio data recorded in the buffer memory 1 is transferred to the IC card 2 at a high speed by the audio data transfer circuit 10, while audio data is continuously recorded into the buffer memory 1 by the audio recording control circuit 5. After the transfer is completed, the audio recording control circuit 5 records the audio data into the IC card 2 again. Accordingly, the audio data temporarily recorded in the buffer memory 1 during the exchange of the IC card 2 is automatically transferred into the newly mounted IC card 2. Thus, the audio date can continuously be recorded without interruption after the exchange of the IC card 2.

When the recording is started in the newly exchanged IC card 2, the recording operation is continued until the stop button is pressed. Moreover, in the case where the IC card 2 is not exchanged after the IC card exchange alarm device 9 issues the alarm, the recording is terminated at the point where the buffer memory 1 is filled with data.

As mentioned above, according to the recording/reproducing apparatus of the present invention, the IC card 2 is exchanged each time the IC card exchange alarm device 9 issues the alarm, whereby a sound such as a conversation can be continuously recorded for a long time period without any interruption. Moreover, the recording/reproducing apparatus requires only a pair of connectors and an interface circuit of the IC card 2, which is helpful for saving space and reducing cost of the apparatus.

As is apparent from the above, according to the recording/reproducing apparatus of the present invention, when the remaining storage capacity in the external memory during the recording, or when the storage capacity becomes less than a fixed volume, the audio data is temporarily stored in the internal buffer memory in the apparatus. The exchange of the external memory makes it possible to automatically transfer the audio data stored in the buffer memory into the newly exchanged external memory, so that the recording can continuously be conducted for long time periods without any interruption of the sound by successively exchanging the external memory.

Various other modifications will be apparent to and can be readily made by those skilled in the art without departing from the scope and spirit of this invention. Accordingly, it is not intended that the scope of the claims appended hereto be limited by the description as set forth herein, but rather that the claims be broadly construed.

What is claimed is:

1. A recording/reproducing apparatus for recording and reproducing an audio signal, comprising:

an audio encoding means for receiving an audio signal and converting the audio signal into audio data;

an external memory means for storing the audio data, the external memory means being mounted in and dismounted from the apparatus at will;

an internal memory means for temporarily storing the audio data, the internal memory means being built in the apparatus;

a memory control means for controlling writing and reading operations of the audio data;

a detection means for detecting the exchange of the external memory means, the detection means producing an output signal when the external memory means is exchanged into another external memory means; and an audio data transfer means for, in response to the output signal from the detection means, transferring the audio data stored in the internal memory means into said other external memory means, wherein the detection means further comprises a storage capacity detection means for detecting that the rest of the storage capacity in the external memory means becomes less than a prescribed level and then outputting a first detection signal indicating that the rest of the storage capacity in the external memory means has become less than the prescribed level.

2. A recording/reproducing apparatus according to claim 1, wherein the memory control means comprises:

an internal memory control means for controlling writing and reading operations of the audio data into the internal memory means; and an external memory control means for controlling writing and reading operations of the audio data into the external memory means.

3. A recording/reproducing apparatus for recording and reproducing an audio signal, comprising:

an audio encoding means for receiving an audio signal and converting the audio signal into audio data;

an external memory means for storing the audio data, the external memory means being mounted in and dismounted from the apparatus at will, an internal memory means for temporarily storing the audio data, the internal memory means being built in the apparatus;

a memory control means for controlling writing and reading operations of the audio data;

a detection means for detecting the exchange of the external memory means, the detection means producing an output signal when the external memory means is exchanged into another external memory means; and an audio data transfer means for, in response to the output signal from the detection means transferring the audio data stored in the internal memory means into said other external memory means, wherein the memory control means comprises:

an internal memory control means for controlling writing and reading operations of the audio data into the internal memory means; and an external memory control means for controlling writing and reading operations of the audio data into the external memory means, and wherein a storage capacity detection means for detecting that the rest of the storage capacity in the external memory means becomes less than a prescribed level and then outputting a first detection signal indicating that the rest of the storage capacity in the external memory means becomes less than the prescribed level;

an exchange detection means for detecting that the external memory means is exchanged into said other external memory means and then outputting a second detection signal indicating that said other external memory means is mounted; and a transfer completion detection means for detecting that all of the audio data temporarily stored in the internal memory means is transferred into said other external memory means, after the audio data transfer means starts transferring the audio data, and then outputting a third detection signal indicating that all of the audio data is transferred into said other external memory means.

4. A recording/reproducing apparatus for recording and reproducing an audio signal according to claim 3, further comprising:

a first request-signal production means for producing a first request-signal requesting the external memory control means to write the audio data into the external memory means;

a second request-signal production means for, in response to the first detection signal, producing a second request-signal requesting the internal memory control means to write the audio data into the internal memory means;

a third request-signal production means for, in response to the second detection signal, producing a third request-signal requesting the internal memory control means to read out the audio data from the internal memory means, and requesting the external memory control means to write the audio data read from the internal memory means into said other external memory means; and a fourth request-signal production means for, in response to the third detection signal, producing a fourth request-signal requesting the external memory control means to write the audio data into said other external memory means.

5. A recording/reproducing apparatus for recording and reproducing an audio signal according to claim 3, further comprising an alarm means for, in response to the first detection signal, issuing an alarm for a memory exchange.

6. A recording/reproducing apparatus for recording and reproducing an audio signal according to claim 1, wherein the external memory means is an IC card.

7. A recording/reproducing apparatus for recording and reproducing an audio signal according to claim 1, wherein the internal memory means has a smaller storage capacity than that of the external memory means.

8. A recording/reproducing apparatus for recording and reproducing an audio signal, comprising:

an audio encoding means for receiving an audio signal and converting the audio signal into audio data;

an external memory for storing the audio data, the external memory being easily mounted in and dismounted from the apparatus;

a secondary memory for storing the audio data;

a memory control means for controlling writing and reading operations of the audio data;

an exchange detector for detecting the exchange of the external memory, the exchange detector producing an exchange completion signal when the external memory is dismounted and replaced with another external memory; and an audio data transfer means for, in response to the exchange completion signal from the exchange detector, transferring the audio data stored in the secondary memory into said other external memory.

9. A recording/reproducing apparatus according to claim 8, wherein the memory control means comprises:

a secondary memory control means for controlling writing and reading operations of the audio data into the secondary memory; and an external memory control means for controlling writing and reading operations of the audio data into the external memory.

10. A recording/reproducing apparatus for recording and reproducing an audio signal according to claim 8, wherein the external memory is an IC card.

11. A recording/reproducing apparatus for recording and reproducing an audio signal according to claim 8, wherein the secondary memory has a smaller storage capacity than that of the external memory.

12. A recording/reproducing apparatus according to claim 8, further comprising a condition detector including at least one of means for detecting a first condition of removal of the external memory and means for detecting a second condition when a storage capacity of the external memory becomes less than a prescribed level, the condition detector outputting a condition signal in response to detection of at least one of the first condition and the second condition.

13. A recording/reproducing apparatus according to claim 12, wherein the internal memory stores audio data in response to the condition signal.

14. A recording/reproducing apparatus according to claim 12, further comprising means for outputting an alarm for memory replacement in response to the condition signal.

15. A method of recording and reproducing an audio signal comprising:

converting an audio signal into audio data;

storing the audio data in an external memory;

detecting when the external memory has been dismounted and outputting a dismounting signal in response thereto;

storing the audio data in a secondary memory in response to the dismounting signal;

detecting when an external memory has been replaced and outputting a replacing signal in response thereto; and transferring the audio data from the secondary memory to the external memory in accordance with the replacing signal.

16. The method according to claim 15, further comprising detecting when a storage capacity of the external memory becomes less than a prescribed level and outputting a warning signal in response thereto.

17. The method according to claim 16, further comprising storing the audio data in the secondary memory when the warning signal is being output.

18. The method according to claim 17, further comprising issuing an alarm for memory replacement in response to the warning signal.

19. The method according to claim 15, further comprising detecting completion of the transferring of all of the audio data stored in the secondary memory into the external memory.

20. The method as recited in claim 19, further comprising storing audio data in the external memory in response to detecting completion of the transferring.

* * * * *